United States Patent [19]

Brassell

[11] Patent Number: 4,842,909

[45] Date of Patent: Jun. 27, 1989

[54] CONTAINER FOR STORING LIQUIDS COMPRISING CARBON-CARBON COMPOSITES

[76] Inventor: Gilbert W. Brassell, 13237 W. Eighth Ave., Golden, Colo. 80401

[21] Appl. No.: 13,501

[22] Filed: Feb. 11, 1987

Related U.S. Application Data

[63] Continuation-in-part of Ser. No. 822,164, Jan. 24, 1986, Pat. No. 4,772,508.

[51] Int. Cl.$^4$ .......................... B32B 9/00; B01D 46/00
[52] U.S. Cl. .................................. 428/34.1; 428/303; 428/339; 428/408; 55/97; 55/523; 55/9; 55/32; 210/205; 220/425; 220/83
[58] Field of Search .................. 428/35, 339, 408, 303

[56] References Cited

U.S. PATENT DOCUMENTS

| | | | |
|---|---|---|---|
| 4,500,328 | 2/1985 | Brassell et al. | 428/297 |
| 4,522,883 | 6/1985 | Wallace et al. | 428/368 |
| 4,530,864 | 7/1985 | Sugie | 428/35 |

*Primary Examiner*—P. C. Ives
*Attorney, Agent, or Firm*—Millen & White

[57] ABSTRACT

Carbon bonded carbon fiber composites are useful to minimize or eliminate volatility, splashing and losses (e.g., due to the effect of applied forces) of liquids in containers, especially of liquid cryogens in dewars. They are also useful as getters for gaseous contaminants, including radon, tritium, etc.

13 Claims, No Drawings

CONTAINER FOR STORING LIQUIDS COMPRISING CARBON-CARBON COMPOSITES

CROSS-REFERENCE TO RELATED APPLICATIONS

This application is a continuation-in-part of U.S. Ser. No. 822,164, filed on Jan. 24, 1986, now U.S. Pat. 4,772,508, entirely incorporated by reference herein.

BACKGROUND OF THE INVENTION

Carbon bonded carbon fiber composites (carbon-carbon composites) (as well as carbon-bonded ceramic fiber composites and ceramic bonded ceramic fiber composites) are well known. See, e.g., U.S. Pat. Nos. 4,500,328, 4,391,873 and 4,152,482, which disclosures are entirely incorporated by reference herein. A major improvement in these composites was made upon the discovery that the carbon components could be surface activated without loss of the exceptional compressive strength of the materials. See U.S. Ser. No. 822,164, now U.S. Pat. 4,772,508, of this inventor. The improved material is especially useful in filtering applications. These include the filtering of particles and gases from fluid streams (liquids and gases) in a wide variety of scenarios, e.g., as replacements for activated carbon in a wide variety of filtering and purifying devices, e.g., home filter devices such as room filters, smokeless ashtrays, water or other fluid purifiers, and also in gas masks, filters likely to be subjected to powerful vibration or shock, etc.

This application is based on the discovery of new uses for all of the mentioned carbon-carbon composites.

SUMMARY OF THE INVENTION

It is an object of this invention to provide new uses for carbon bonded carbon fiber composites.

Upon further study of the specification and appended claims, further objects and advantages of this invention will become apparent to those skilled in the art.

These objects have been achieved by providing a container useful for storing liquids comprising containment walls defining an interior region for containing a liquid and, substantially filling said interior region, a carbon bonded carbon fiber composite having a surface area greater than about 100 $m^2/g$ and a compressive strength of about 20 psi or higher;

and also by providing a method of containing a liquid while minimizing splashing or loss due to applied forces during containment or minimizing volatility of the liquid, comprising storing the liquid in a container whose containment space is substantially filled with a carbon bonded carbon fiber composite having a porosity and surface area sufficiently high to decrease splashing or volatility of the liquid;

and also by providing a combination for providing a substantially gas-tight closed region comprising containment walls and inside said walls a getter for gaseous impurities which is a carbon bonded carbon fiber composite having a surface area greater than about 100 $m^2/g$ and a compressive strength of about 20 psi or higher;

and also by providing, in a method of gettering gaseous impurities in a closed region comprising maintaining a getter in said region, the improvement wherein said getter is a carbon bonded carbon fiber composite having a porosity and surface area sufficient to getter said impurities;

and also by providing a method of filtering radon from a fluid stream containing the same comprising passing said stream through a filter comprising a carbon bonded carbon fiber composite having a surface area greater than about 100 $m^2/g$ and a compressive strength of about 20 psi or higher;

and also by providing a method of filtering tritium from a fluid stream containing the same comprising passing said stream through a filter comprising a carbon bonded carbon fiber composite having a surface area greater than about 100 $m^2/g$ and a compressive strength of about 20 psi or higher.

DETAILED DISCUSSION

It has been discovered that carbon-carbon composites are very successful in eliminating the sloshing, splashing, spillage, etc., normally associated with the movement of liquids in containers. The porosity of the composites is sufficiently high that the liquids will still occupy mos&: of the liquid-containing volume, even when the composite fully occupies the volume. Thus, the liquid capacity of a composite-filled container is not unacceptably lowered, as discussed further below. However, because of the effect of the composite's pores on the contained liquid, i.e., the adsorbent interaction between the liquid and the composite, the liquid has a greatly decreased tendency towards sloshing, splashing, spilling, etc., and also has a lowered volatility.

Thus, in general, the effect of the composite in this use of this invention is to minimize or eliminate the effect of disturbances such as the application of force, sudden or otherwise, typically leading to loss of the liquid.

Particularly useful applications of this aspect of the invention include the use of the composites in dewars, particularly cryogenic dewars, but also other dewars such as the common vacuum-walled devices including thermos-type bottles, fuel tanks, particularly vehicular or aircraft fuel tanks containing gasoline, diesel fuel, kerosene, jet fuel, etc., pressurized cylinders, e.g., those containing the liquid phase of normally gaseous materials, as well as essentially any container normally containing a liquid.

For example, in many outer space and other applications (e.g., labs, helicopters, aircraft, and many others), it is necessary to have on board a cryogenic dewar to perform various cooling tasks, e.g., the cooling of radiation sensors. During the launch of a satellite, all components, of course, are subjected to very high g-forces. Heretofore, this resulted in a loss of cryogens on the order of about 50 percent. Aluminum foam has been used in the past in attempts to ameliorate this problem.

In accordance with this invention, the presence of the carbon-carbon composite significantly lowers and essentially even eliminates this type of loss. On the other hand, as mentioned, some of the interior volume previously capable of storing the liquid is lost due to the presence of the composite in the dewar. With typical porosities of about 80-90 percent (this range not being critical), on the order of only 10 percent or so of the volume of a container is lost per this invention. However, since there is essentially no loss due to the g-forces, this represents a very significant improvement over the prior art loss of 50 percent. As a result, the flight lifetime of space missions can be correspondingly lengthened.

Essentially any liquid can be contained in a container device which incorporates a composite as described above. This invention, of course, will be most applicable to liquids which, after adsorption by the composite, will still be easily removable (desorbable) under the desired "pouring" conditions. Thus, very viscous liquids such as oils will be less useful since it will be difficult under most circumstances to desorb them from the carbon composite of this invention.

Suitable cryogenic liquids include any of the well known cryogens, e.g., nitrogen, oxygen, hydrogen, helium, argon, other inert gases, chlorine, bromine, etc.

The precise nature of the pore structure of the carbon-carbon composite is not critical. Any of the composites described in Ser. No. 822,164, now U.S. Pat. No. 4,772,508, utilized. Even the older composites known prior to the invention of 822,164, now U.S. Pat. No. 4,772,508, will be applicable in those situations where the best performance is not necessary. In general, the smaller the pore size of the composite, the better will be the effect. This is especially true for cryogens based on very small atoms or molecules, especially helium. It is presently theorized that the best performance for liquid helium will be achieved where the pore size is 14 angstroms or less. It is preferred in general for all applications that the pore size be in the range of about 1-1,000 angstroms. These pore size values refer to the pores created in the fibers by the activation treatment. The typical pores in the composite based on spacings between fibers (e.g., 0.1- 0 micrometers) are not important since these have a very minor effect.

Correspondingly, the higher the surface area of the composite, the better the performance in accordance with this invention. Typically, the surface area will be in the range of 10-1,200 $m^2/g$ or even higher, preferably at least 200 $m^2/g$, values of 300, 400, 500, 600, 700, 800, 900, 1,000, 1,100, 1,200, etc., and all values in between, of course, being useful. Most preferably, the surface area will be at least 400 $m^2/g$ and, even more preferably, at least 600 or 800 $m^2/g$.

The pore size can be attained by the activation treatments described in U.S. Ser. No. 822,164, now U.S. Pat. No. 4,772,508; in general, the more vigorous the treatment, the smaller the pore size. The precise nature of the pore size (which is not critical) will also be determined in part by the chemical composition of the fibers. A suitable pore size can be routinely achieved in conjunction with the guidelines of this specification and, perhaps, a few routine orientation experiments. Surface area can be modified as described in U.S. Ser. No. 822,164, now U.S. Pat. No. 4,772,508. Typically, the more vigorous the surface activation treatment, the higher will be the surface area.

Another advantage of the use of the composites of this invention in this particular application is their high compressive strength. Without the unique structural integrity of these materials, it would not be possible to satisfactorily fabricate the dewars with the composite inserts. In addition, normal vibration and even high vibration in particular applications would lead to a crumbling of the carbon, thereby leading to deleterious contamination effects and increased sloshing, splashing, etc.

The fabrication of the containers including the composite inserts of this invention is exceedingly simple. At an appropriate point in the otherwise conventional fabrication of the container, the composite material is simply inserted into the finished body of the container and then the appropriate neck, lid, top, etc., is attached. It is also possible to build the body around the insert. Nothing more than rudimentary manipulations is involved. For example, in the case of dewars, in the normal preparation, the body of the dewar is fabricated first and then the neck is welded thereto. To fabricate the dewar in accordance with this invention, it is only necessary to place the composite material into the dewar when its basic body is completed. Thereafter, under an argon or other purge (to minimize the danger of fire or contamination of the carbon composite at high welding temperatures), the neck is then fully conventionally welded to the body.

The composite material is very simply fabricated into the precise shape and size needed using the fully conventional techniques described in the references discussed above. Generally, the material will be sized and shaped to fit snugly into the interior space of the container in order to minimize splashing and banging of the material against the walls. In a dewar-type shape, a small region may optionally be left adjacent the neck to facilitate filling and pouring. Any size container can be accommodated in accordance with this invention because of the unique ability of the carbon-carbon composite to be molded or processed into very small or very large shapes on the order of centimeters or less or many meters or more.

With respect to the dewar application, in a preferred embodiment, the composite will be graphite-filled as described in U.S. Pat. No. 4,391,873, incorporated above. This will enhance the homogeneity of temperature inside the dewar by increasing the thermal conductivity of the composite. Of course, other equivalent conductive fillers can be utilized. Typically, the amount of filler, especially graphite, will be 10-30 wt % based on the total weight of the filled composite.

When the container normally houses flammable liquids, this invention reduces the danger of fire and/or explosions by reducing the volatility of the liquid, in addition to reducing splashing, spillage, etc. Thus, it significantly increases the safety of the use of such devices, especially fuel tanks for motor vehicles, airplanes, etc., and most especially in accidents and other abnormal situations.

Of course, the container/composite and container/composite/liquid combinations of this invention include containers which are closed or which are unclosed.

Due to the unique adsorption abilities of the materials mentioned above, these composites are also highly useful for gettering gaseous materials. Typically, such getters will be utilized in closed systems which are maintained at pressures less than atmospheric. Preferably, they will be utilized in systems which are under high vacuum, e.g., less than $10^{-2}$ torr, preferably less than $10^{-3}$ torr, most preferably less than $10^{-6}$ torr, $10^{-8}$ torr, $10^{-9}$ torr, etc. The gettering effect, of course, will be utilizable even in systems involving pressures greater than atmospheric. This is especially true in view of the high compressive strength of the materials.

All of the details discussed above with respect to the liquid-containment application apply to this gettering application unless indicated otherwise below.

In contrast to the liquid-containment application, the carbon-carbon composite materials should not fill the region in which the gettering effect is desired. Where a vacuum region is involved, this would enhance chances of increasing the thermal conductivity from one vacuum wall to another, thereby offsetting a major advantage of the vacuum region. Typically, only a very small piece of the composite need be inserted in the closed region to achieve the desired gettering effects. The precise size of the material, e.g., surface area and total volume, can routinely be determined by conventional considerations of the size of the closed region, the vacuum level desired, the leak rate into the closed region of the impurities to be gettered, the porosity of the material, its surface area, the desired lifetime of the gettering material, etc. For example, to getter the vacuum space in the walls of a liquid helium dewar, with the aim primarily of gettering helium leaking into the space, 16 wafers of carbon-carbon material of a size of $1 \times 1 \times 0.25$ inches were mounted on an aluminum plate and inserted into the interior of the vacuum space. The dewar was approximately 5 feet high, 3 feet wide and had a surrounding vacuum wall having a 1 inch vacuum space. The vacuum level of the space was $10^{-9}$ torr. This system was designed to last one or two years based on the conventional leak rate of helium into these walls in such dewars.

As with the other uses mentioned above, a major advantage of this invention is that the structural integrity of the material essentially eliminates the likelihood that the gettering material will crumble and contaminate the vacuum chamber.

In general, the unique getter of this invention can be utilized in any prior art situation where getters have previously been utilized. They will have wide applicability since they are able to adsorb a very wide spectrum of gases and particulate matter, including radioactive species.

The composite materials of this invention are also particularly useful in filtering applications where it is desired to remove radon or tritium from fluids, usually gases. Thus, as described in U.S. Ser. No. 822,164, the material can be configured in cartridges through which a fluid stream is passed. Analogously, they can be made in relatively large sizes and configured to fit on smoke stacks, exhaust outlets, etc., to filter the associated exhaust and waste streams. Since the amount of radon or tritium adsorbed by the composite material can be conventionally measured, it is also possible to use the material as a diagnostic tool. Thus, the method of filtering radon or tritium in accordance with this invention includes filtering for the purposes of measuring the amount of radon or tritium loaded onto the filter in a given time. Such a value can routinely be correlated with the radon or tritium levels in a given environment using conventional calibration techniques. Of course, this concept can be extended to other filtering applications utilizing the composite material.

Insofar as radon is concerned, this aspect of the invention will be very useful in view of the current major concern over abnormal radon levels in residential, business, etc., areas. Where appropriate, the material of this invention can be utilized to filter radon from desired areas or to provide a means of determining the amount of radon in an area.

With respect to use of the material of this invention as a tritium getter or tritium sponge, the situation is fully analogous to that discussed above with respect to radon. Typical environments where this will be especially applicable are those wherein tritium is likely to be present in the atmosphere, e.g., nuclear fusion laboratories or plants, laboratories or industrial facilities working with tritium, etc.

The porosity of the carbon-carbon material for the gettering and filtering applications will not be as important as it is for the liquid-containment applications. However, essentially the same materials will be useful for the filtering and gettering applications as are useful for the filtering applications. Generally, it will be possible to utilize less porous materials for the filtering and gettering applications, as well as those which have somewhat lower surface areas. For instance, although lower surface areas are utilizable in both cases, for the liquid-containment system best results begin to appear at values of around 200 m$^2$/g, whereas for the filtering and gettering applications, acceptable results are achieved even at values of about 100 m$^2$/g.

The use of the composites of this invention (including those of Ser. No. 822,164, now U.S. Pat. No. 4,772,508) as especially applicable to closed areas where air is recirculated through a filter, e.g., airplane cabins, buildings, homes, etc. The high efficiency, durability, strength, etc. and broad applicability to a wide range of contaminants of the composites make them exceptionally advantageous for this purpose.

From the foregoing description, one skilled in the art can easily ascertain the essential characteristics of the invention and, without departing from the spirit and scope thereof, can make various changes and modifications of the invention to adapt it to various usages and conditions.

What is claimed is:

1. A container useful for storing liquids comprising (a) containment walls defining interior region for containing a liquid, and (b) material substantially filling said interior region which is carbon bonded carbon fiber composite having a surface area greater than about 100 m$^2$/g and a compressive strength of about 20 psi or higher.

2. A container of claim 1 wherein said surface area is greater than about 300 m$^2$/g.

3. A container of claim 1 wherein said surface area is greater than about 600 m$^2$/g.

4. A container of claim 2 which is a vacuum dewar.

5. A container of claim 4 wherein said composite is filled with graphite.

6. A dewar of claim 4 which is adapted for containing cryogenic liquids.

7. A dewar of claim 6 adapted for use in cooling radiation detectors.

8. A container of claim 1 which is a fuel tank.

9. A container of claim 1 which is a pressurized cylinder for holding a normally gaseous material in the liquid phase.

10. A dewar of claim 6 further comprising a cryogenic liquid in said interior region.

11. A dewar of claim 10 wherein said cryogenic liquid is liquid helium, liquid hydrogen, liquid nitrogen or liquid oxygen.

12. A fuel tank of claim 8 further comprising a liquid fuel.

13. A fuel tank of claim 12 wherein said fuel is, gasoline, diesel fuel, kerosene or jet fuel.

* * * * *